Oct. 5, 1948.　　　　　M. B. MOORE　　　　　2,450,841
SENSITIZED-MATERIAL HOLDER FOR PHOTOGRAPHIC CAMERAS
Filed Dec. 21, 1946　　　　　　　　　　　　　4 Sheets-Sheet 1
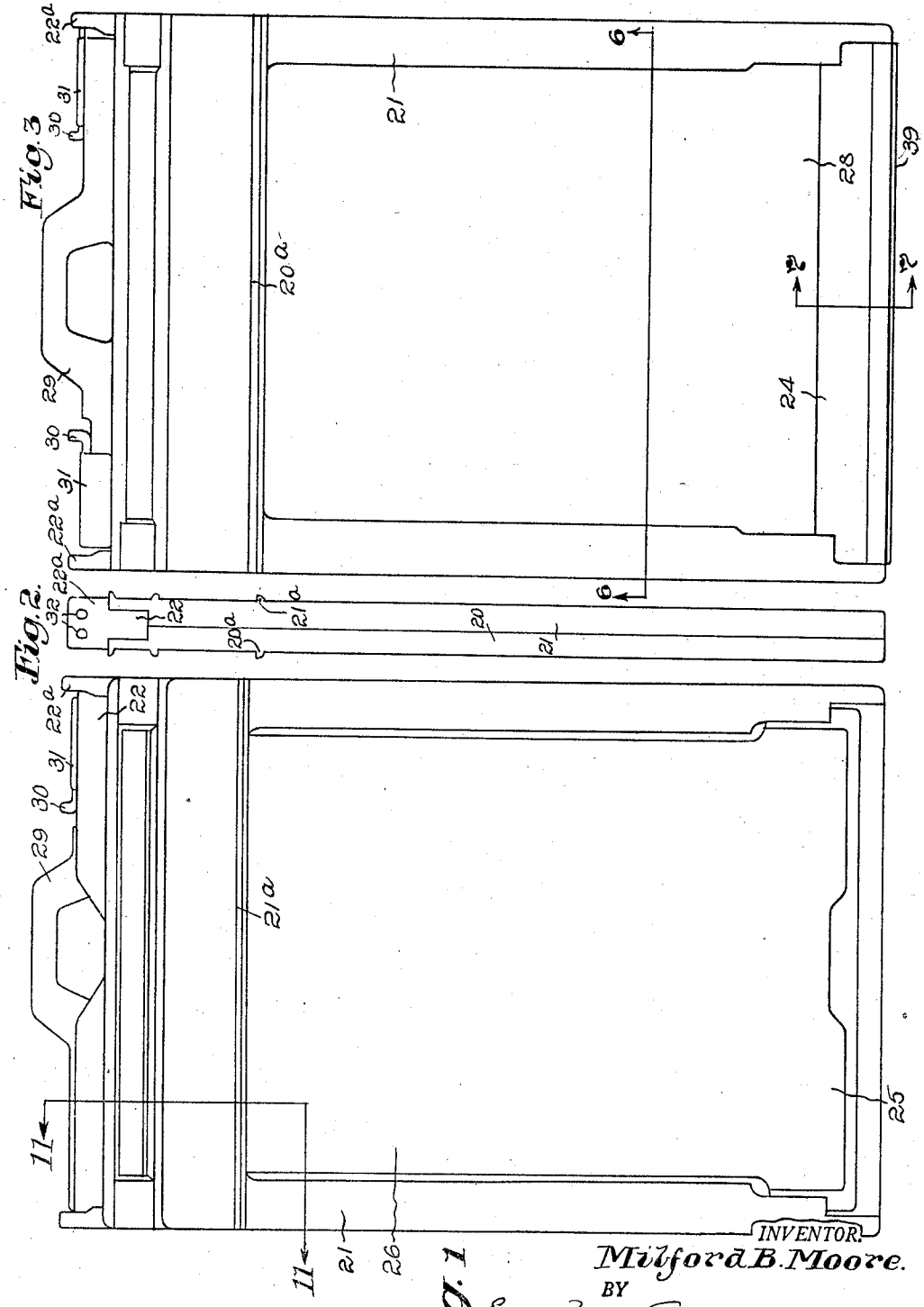

Oct. 5, 1948.  M. B. MOORE  2,450,841
SENSITIZED-MATERIAL HOLDER FOR PHOTOGRAPHIC CAMERAS
Filed Dec. 21, 1946  4 Sheets-Sheet 2
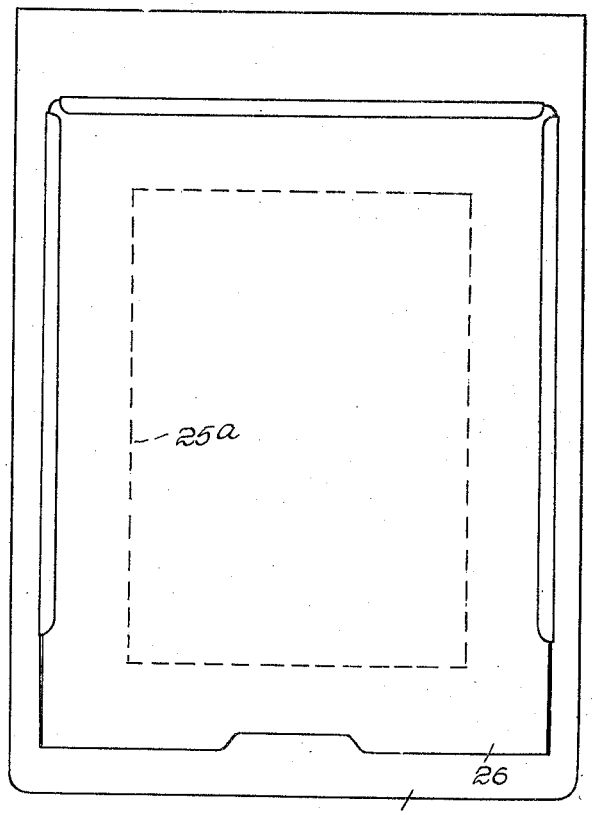
Fig. 4
Fig. 5
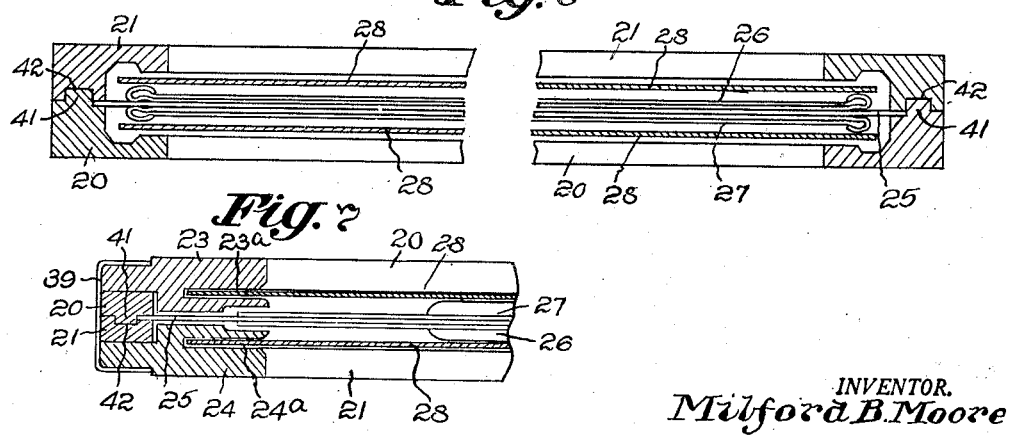
INVENTOR.
Milford B. Moore
BY
Attys Oct. 5, 1948.  M. B. MOORE  2,450,841
SENSITIZED-MATERIAL HOLDER FOR PHOTOGRAPHIC CAMERAS
Filed Dec. 21, 1946  4 Sheets-Sheet 3

INVENTOR.
Milford B. Moore
BY
Emery, Booth, Townsend, Miller and Lowtim
Attys

Oct. 5, 1948.　　　　　M. B. MOORE　　　　　2,450,841
SENSITIZED-MATERIAL HOLDER FOR PHOTOGRAPHIC CAMERAS
Filed Dec. 21, 1946　　　　　　　　　　　　　　　4 Sheets-Sheet 4
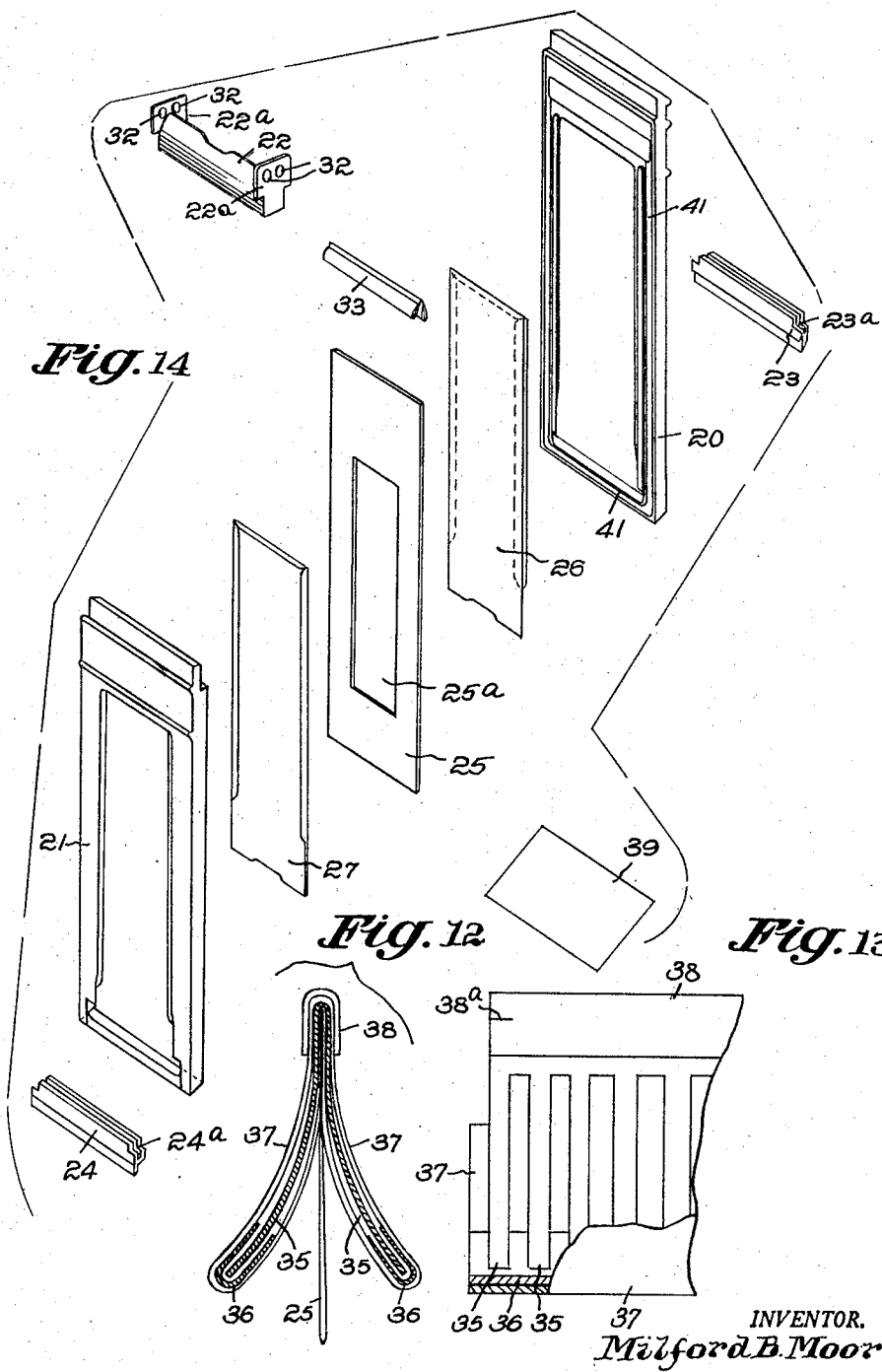
INVENTOR.
Milford B. Moore.
BY Patented Oct. 5, 1948

2,450,841

UNITED STATES PATENT OFFICE 2,450,841

SENSITIZED-MATERIAL HOLDER FOR PHOTOGRAPHIC CAMERAS

Milford B. Moore, Brighton, N. Y., assignor to Graflex, Inc., Rochester, N. Y., a corporation of Delaware Application December 21, 1946, Serial No. 717,690

12 Claims. (Cl. 95—67)

This invention relates to a sensitized material holder for photographic cameras.

In order that the principle of the invention may be readily understood, I have disclosed a single embodiment thereof in the accompanying drawings, wherein—

Fig. 1 is a plan view of the sensitized material holder with one of the dark slides removed, and with the film flap also removed, so as more clearly to show the construction of the holder;

Fig. 2 is a left-hand end view of the construction shown in Fig. 1;

Fig. 3 is a view similar to Fig. 1, but showing both of the dark slides and the flap in place in the holder;

Fig. 4 is a view of the separator of the holder showing the position of the film septum plates therein;

Fig. 5 is a right-hand end view of the construction shown in Fig. 4;

Fig. 6 is a vertical section through Fig. 3, taken on the line 6—6 of Fig. 3;

Fig. 7 is a partial horizontal section through Fig. 3, taken on the line 7—7 thereof;

Fig. 12 is an enlarged end view of the light valve or seal, showing it mounted on the separator plate;

Fig. 13 is a plan view, partly in section, of the light valve or seal; and

Fig. 14 is an exploded view of the holder clearly showing the assembly of the several parts that make up the holder, the dark slides not being shown.

Figure 8:
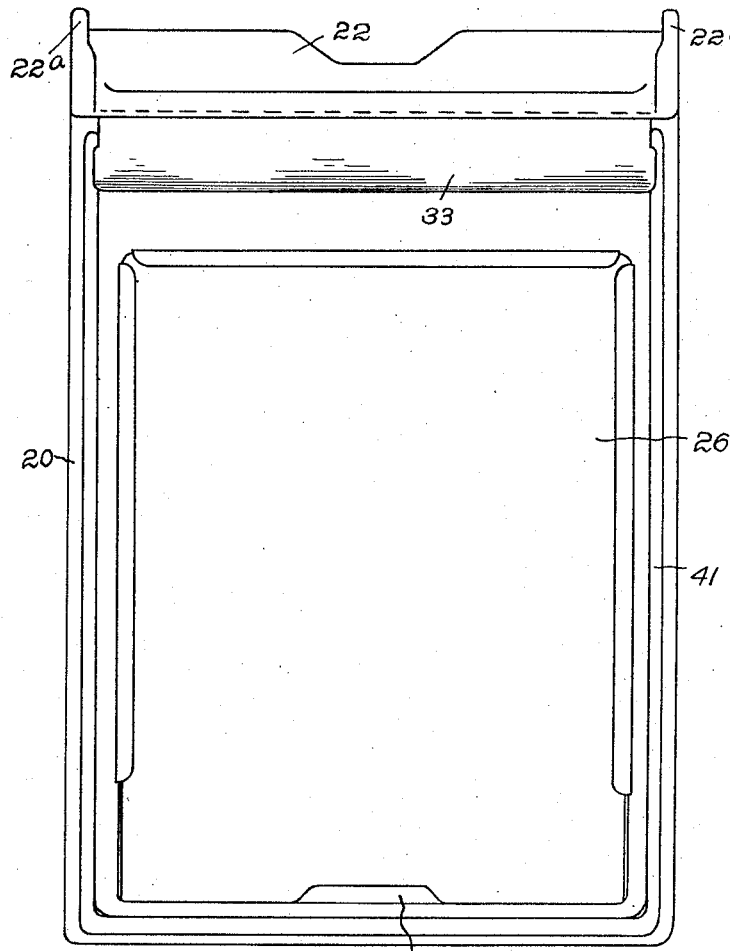
Fig. 8 is a view similar to Fig. 3, the dark slide in one of the castings being removed to show clearly the construction and the position of the separator plate and the light valve.
Figures 9, 10:
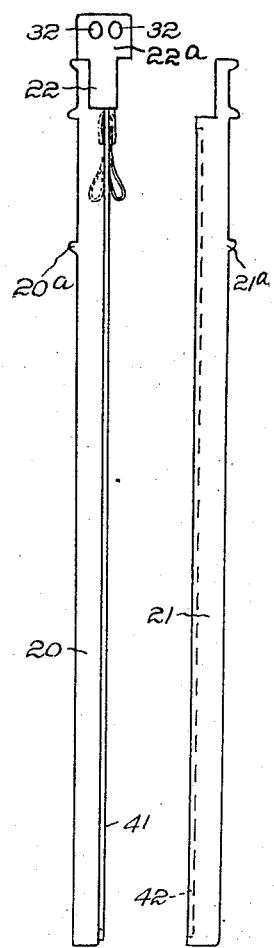
Fig. 9 is a left-hand end view of the construction shown in Fig. 8.
Fig. 10 is an end view of the second casting of the holder.

It has long been desired to produce a film or plate holder in such manner or by such method as would allow the economical manufacturing thereof from a material other than wood, as, for example, metal die castings or plastic moldings. There have been numerous attempts to accomplish this, but I believe I am the first to produce a sensitized material holder for films and for plates that can be economically manufactured from either plastics or metal and that, as a result, is superior to the well known wood construction.

In the specification and claims, except where otherwise expressly stated, I use the term "holder" to mean a holder for sensitized material that may be a film or that may be a plate.

The principal objects of the present invention are to provide a film or plate holder that can be economically manufactured from die castings; to provide a holder that can readily be manufactured from plastic moldings; to provide a holder that is thinner in cross section although maintaining the standard depth of focus; to provide a holder having a simple separator plate that carries the film septum plates; to provide a separator plate and septum plates assembly that can be manufactured as a unit which is to be placed in the holder when the holder proper is assembled; to provide a holder that, when once assembled, is light-tight and will remain light-tight throughout the life of the holder; and to provide a holder of such simple construction that it can be assembled by unskilled operators. Other objects of the invention will be apparent from the ensuing description.

Referring first to Figs. 1 to 5, the sensitized material holder is made up primarily of two castings 20 and 21, a divider or cross member 22, two flaps 23 and 24, a separator plate 25, and two septum plates 26 and 27. The construction of the separator plate and the position of the septum plates is most clearly shown in Figs. 4 and 5. The said holder is provided with the usual dark slides 28, 28 having handles 29, 29. Fitted to the said handles 29 are locking members 30 that are each held to the respective handles 29 by means of a clip or bracket 31. The said locking members 30, when in the locked condition, engage holes 32 in a boss-like formation 22a integral with the cross member 22.

Figure 11:
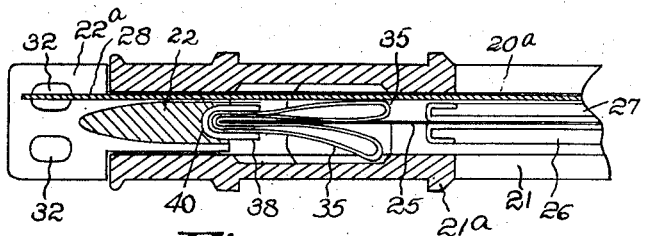
Fig. 11 is a fragmentary vertical section through Fig. 1, taken on the line 11—11 of Fig. 1.

Applied but non-attached to the upper end of the separator plate 25 is a light valve or seal 33, shown in assembly in Fig. 11 and in detail in Figs. 12 and 13, and which is made in the following manner. A strip of metal 34 having extending fingers 35 that are curved in an outward direction is formed into an inverted V-shape, as most clearly shown in Fig. 12. Over the ends of the said fingers 35 is fitted a U-shaped piece of heavy paper 36, 36, and around the entire lightvalve assembly is placed a piece of soft opaque cloth 37. This light-valve assembly is then placed over the end of the separator plate 25 and is held thereto by a U-shaped metal clip 38 crimped at 38a to retain the parts of the light-valve assembly together. Viewing Figs. 4 and 5, it will be evident that the separator plate 25 is itself thin and readily insertible into the apex of the light valve or seal, as shown in Fig. 12, where it is held pinched in place but is non-attached to the said light valve or seal in a place where the two septum plates 26, 27 could not readily themselves be received. In order to lighten the structure, the separator plate 25 has its central portion preferably cut out, as indicated in dotted lines at 25a in Fig. 4. The U-shaped metal clip 38 is snugly received in the large recess in the cast cross member 22.

Referring to Figs. 4 to 11, the sensitized material holder is assembled in the following manner. Fitted to the casting 20, Fig. 8, is the separate plate 25, Figs. 4 and 5, having attached thereto the film septum plates 26 and 27 and the light valve or seal 33. The cross member 22 is then put in place, and to this assembly is added the second casting 21, Fig. 10. The flaps 23 and 24 are then put in place, as indicated in Fig. 7, and to the flaps 23 and 24 and also to the bottom edge of the castings 20 and 21 is glued a fabric hinge member 39, shown detached in Fig. 14. The said flaps 23 and 24 are free to hinge with respect to the castings 20 and 21 because of the flexible nature of the hinge member. The separator plate 25 is fitted into a space provided therefor between the two castings 20 and 21, as clearly indicated in Figs. 6 and 7, and it is held in place by the cross member 22 that has a groove formation on its lower end, indicated at 40, Fig. 11, and which engages the said U-shaped metal clip 38 of the light valve or seal 33, previously referred to, said cast cross member 22 thus snugly receiving the light valve or seal which is not actually attached to said cast cross member 22.

In order to render the sensitized material holder light-tight, the casting 20 is provided with a projection or key 41 that fits in a groove 42 of the casting 21, thus rendering the holder light-tight on three sides. The light valve or seal 33 renders the said holder light-tight on the fourth or top side. There is a space provided between the septum plates 26 and 27 and the castings 20 and 21, as best shown in Figs. 6, 7 and 11, into which the dark slides 28 are fitted. When a dark slide is removed, the sensitized material holder is maintained light-tight, because of the light valve or seal 33, in a manner well known in the art, and clearly indicated in Fig. 11.

In manufacturing, several different types of construction can be used. For example, the separator assembly, made up of the separator plate 25 and the film septum plates 26 and 27, can be held together by means of rivets, spot welding, or preferably by the use of one of the now well known cements for this purpose. The castings 20 and 21 and the cross member 22 can also be assembled either by riveting or by being cemented together. It has been found in practice that this holder lends itself in an ideal manner for assemblage by adhesives. However, riveting, spot welding and cementing have been used with entirely satisfactory results.

In order to render the sensitized material holder light-tight when placed in a camera, I provide keys 20a and 21a on the castings 20 and 21, respectively, that fit into a suitable groove in the camera back, and in order to render the said holder light-tight when the dark slides 28 are in position in the camera, I have provided grooves 23a and 24a in the flaps 23 and 24, respectively.

I have herein set forth a new, sensitized material holder construction that is made up of five simple castings, namely, the two main castings 20 and 21, the divider 22 and the flaps 23 and 24; three simple punch press parts, namely, the separator plate 25 and two identical septum plates 26 and 27; and a light valve or seal 33 that holds the stamped separator plate 25 firmly pinched in place between the two depending portions of said light valve or seal but non-attached thereto. These parts can all be made by standard manufacturing practice while at the same time maintaining a very high degree of accuracy in the finished holder and without the use of skilled personnel in its manufacture.

While I have referred to the septum plates 26, 27 as film septums, it is to be understood that they may also receive sensitized plates in the folded-over lateral edges and top edge thereof, if the holder be constructed for that purpose.

The holder is herein shown and described as a duplex holder but it is evident that the principles of construction herein disclosed are applicable in part at least to a holder carrying only a single film or plate.

Because of the much greater sensitivity of the sensitized materials now available, it is important that the holder be absolutely light-tight. This condition is maintained constantly in the construction herein disclosed. A further requirement of holders for present day use is that a high degree of accuracy be maintained in the so-called depth of focus of the holder, by which I mean the distance from the face of the holder to the sensitized material, whether film or plate.

Present day cameras are manufactured with a high degree of accuracy but this accuracy is rendered ineffective if a holder be used that does not in itself maintain a high degree of accuracy. This accuracy cannot, so far as I am aware, be obtained in a sensitized material holder of the usual construction. It has been found, however, through the practice of my invention herein disclosed that a sensitized material holder having all of these qualities can be produced at a cost no greater than the cheapest of the present constructions.

This invention is clearly distinguished in structure from that in the patent to Byron L. Smith, No. 2,344,951, March 28, 1944, in which is disclosed a photographic film holder composed wholly of plastic material, but particularly intended to be submerged in a photographic solution with the film or films still held therein.

Having thus described one illustrative embodiment of the invention, it is to be understood that although specific terms are employed, they are used in a generic and descriptive sense and not for purposes of limitation, the scope of the invention being set forth in the following claims.

I claim:

1. A separator assembly for a sensitized-material photographic holder comprising a separator plate 25 having a light valve or seal consisting of material sharply bent along a median transverse line into inverted V-shape at the upper end of said separator plate and with the two opposite depending portions of said light valve or seal extending down a short distance at the two faces of the separator plate to establish a light-seal with respect to the dark slides when the latter are in position in said holder, and with respect to the body of the holder when the dark slides are removed, said separator plate having a film receiving septum plate secured to each face thereof.

2. A wholly non-wooden photographic holder for sensitized material comprising two unitary main members 20, 21 secured together in face-toface relation, there being a cross member 22 between the upper ends of said members and flaps 23, 24 at the outside of the lower ends of said members, a separator plate 25 positioned between said two members and having a sensitized material-receiving septum plate secured to each face thereof, two dark slides, an inverted V-shaped light valve or seal partly of resilient material and partly of fabric construction positioned at the upper edge of said separator plate below said cross member, the latter having a relatively deep recess extending along its entire lower edge wherein the apex of said light valve or seal is snugly received and thereby held in position, the two portions of the said inverted V-shaped, light-valve or seal formation filling the space between the separator plate and the said dark slides along transverse areas, and, upon withdrawal of the dark slides, filling the space between the said separator plate and the inner faces of said main members along said transverse areas, said non-wooden holder being thinner in cross section than a wooden holder receiving the same sized sensitized material, but nevertheless maintaining the standard depth of focus.

3. A photographic holder for sensitized material comprising two, unitary, open, rectangular members secured together with their inner faces in contact throughout their respective two sides and their respective transversely extending bottom portions, and with their respective upper transversely extending portions spaced apart, a cross member recived between the upper spaced-apart transversely extending portions of said rectangular members and having a large light valve or seal-receiving recess extending along its entire lower edge, a light valve or seal of inverted V-shape, the apex of which is snugly received in the said recess, but which light valve or seal is non-attached to said cross member, and the two, opposing, extending portions of which light valve or seal are adapted to contact with inserted dark slides, a thin separator plate 25, the upper end of which is received and thereby pinched within the apex of the inserted non-attached V-shaped light valve or seal, said separator plate 25 extending from said apex between and parallel with the said two rectangular members throughout substantially the internal area thereof, and two thin septum plates 26, 27 secured flatwise to opposite faces of said separator plate 25 below the upper edge thereof that is received in the apex of the light valve or seal, said septum plates 26, 27 each having an edge formation to receive a sheet of sensitized material.

4. A photographic holder for sensitized material in accordance with claim 3, but wherein the said non-attached light valve or seal includes a strip of metal extending transversely of the holder and folded along its median transverse line and having two rows of depending fingers at opposite sides respectively of said separator plate 25, and two pieces of fibrous material fitted respectively about the lower ends only of the said two rows of fingers, and a strip of opaque fibrous material extending substantially entirely about the said metal strip, the fingers thereof and the two pieces of fibrous material.

5. A photographic holder for sensitized material in accordance with claim 3, but wherein the said non-attached light valve or seal includes a strip of metal extending transversely of the holder and folded along its median transverse line and having two rows of depending fingers at opposite sides respectively of said separator plate 25, two pieces of fibrous material fitted respectively about the lower ends only of the said two rows of fingers, a strip of opaque fibrous material extending substantially entirely about the said metal strip, the fingers thereof and the two pieces of fibrous material, and an inverted U-shaped metal holding clip enclosing the said light valve or seal and received within the said large transversely extending recess of the said cross member, and thereby holding said light valve or seal in position in said recess.

6. A separator assembly for a sensitized material-receiving photographic holder having an inserted V-shaped light valve or seal therein near its upper end, comprising a thin separator plate 25 adapted to be received and held pinched in the apex of said light valve or seal but non-attached thereto, said separator plate extending lengthwise of such holder throughout substantially the internal area thereof, and two film septum plates 26, 27 fastened flatwise to the opposite faces of the said separator plate 25 below the upper end thereof that is pinched in the apex of said light valve or seal, and having edge formations for the reception respectively of two sensitized films.

7. A wholly non-wooden photographic holder for sensitized material comprising two mating, open, integral, rectangular, cast members each integrally made from a die casting and permanently secured together with their inner faces in contact throughout their respective two sides and their respective transversely extending bottom portions and with their respective upper transversely extending portions spaced apart, two dark slides received in said cast members; a cast cross member made from a die casting and positioned between said two cast rectangular members at the upper end thereof, where said two cast members are spaced apart, said two rectangular cast members being so secured together and with said cast cross member held in its said position between them; said cast cross member having a relatively large recess formed therein along its entire lower edge; a light valve or seal of an inverted V-shape with its median-line apex snugly received in said recess of said cast cross member but non-attached thereto, and its two opposite depending portions extending downward between and in contact respectively with the inner faces of the said two dark slides, a thin separator plate 25 inserted and thereby held pinched between the the two opposite portions of the light valve or seal but non-attached thereby, and extending substantially to the top of the inner face of the apex of said light valve or seal along the median line thereof, the said separator plate 25 extending from said apex downwardly throughout substantially the entire internal length and width of said two rectangular cast members; two thin septum plates 26, 27 secured respectively flatwise to the opposite faces of said separator plate 25, and terminating at their upper ends materially short of the top of the inner face of the said apex of said light valve or seal, each of said septum plates 26, 27 having edge formations to receive sensitized sheets; and two transversely extending cast flaps each integrally made from a die casting, and extending transversely along the lower ends of said two rectangular cast members respectively and hingedly secured thereto to receive the lower edges of the said two inserted dark slides.

8. A photographic holder for sensitized material in accordance with claim 7, but wherein the said non-attached light valve or seal is composed of a transversely extending strip of metal folded along its median transverse line and having two rows of depending fingers at opposite sides respectively of said separator plate, with two pieces of fibrous material fitted respectively about the lower ends of the said two rows of fingers, there being a strip of opaque fibrous material extending substantially entirely about the said metal strip, the fingers thereof and the said two pieces of fibrous material, and an inverted U-shaped metal holding clip enclosing the said light valve or seal and received within the said large transversely extending recess of the said cross member, and thereby holding said light valve or seal in position in said recess.

9. A photographic holder for sensitized material in accordance with claim 7, but wherein the said non-attached light valve or seal comprises a transversely extending strip of metal folded along its median transverse line and having two, like, outwardly curved, extending portions enclosed by fibrous material, there being an inverted U-shaped metal holding clip enclosing the light valve or seal and received within the said large transversely extending recess of the said cross member, and thereby holding said light valve or seal in position in said recess.

10. A light valve or seal for a photographic holder that has an upper transversely extending member provided with a transversely extending recess along its entire under edge, said light valve or seal consisting of a metallic strip folded along its longitudinal median line and having two sets of spaced fingers extending from edges thereof, said strip and fingers being together of inverted V-shape, fabric matrial applied to the lower ends only of the two sets of said fingers, an opaque fabric applied to the entire faces of said fingers outside of said fabric material and a metal clip-like member of inverted U-shape tightly engaging the apex of the light valve or seal to hold it in position, said light valve or seal constituting an entity insertible into such recess of such top transversely-extending member of the photographic holder.

11. A light valve or seal structure in accordance with claim 10, but wherein there is provided a septum-carrying separator plate for reception in said holder, and wherein the said structure is held to the upper end of said separator plate by the said metal clip-like member.

12. A light valve in accordance with claim 11, but wherein the fabric applied to the lower end of each of the sets of fingers is composed of heavy paper, and wherein the fabric applied to the faces of the fingers is a soft, opaque cloth.

MILFORD B. MOORE.

REFERENCES CITED

The following references are of record in the file of this patent:

UNITED STATES PATENTS

| Number | Name | Date |
| --- | --- | --- |
| 766,869 | Borsum | Aug. 9, 1904 |
| 925,895 | Goddard | June 22, 1909 |
| 1,270,330 | Ruttan | June 25, 1918 |
| 1,631,479 | Folmer | June 7, 1927 |
| 1,641,420 | Folmer | Sept. 6, 1927 |
| 2,099,976 | Hagedorn | Nov. 23, 1937 |
| 2,203,912 | Levin | June 11, 1940 |
| 2,268,417 | Neuschafer | Dec. 30, 1941 |
| 2,326,075 | Smith | Aug. 3, 1943 |
| 2,431,356 | Willcox | Nov. 25, 1947 |